US007715556B2

(12) United States Patent
Chang et al.

(10) Patent No.: US 7,715,556 B2
(45) Date of Patent: May 11, 2010

(54) KEY ESTABLISHMENT METHOD AND SYSTEM USING COMMUTATIVE LINEAR FUNCTION

(75) Inventors: Ku Young Chang, Daejeon (KR); Do Won Hong, Daejeon (KR); Hyun Sook Cho, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1007 days.

(21) Appl. No.: 11/449,405

(22) Filed: Jun. 8, 2006

(65) Prior Publication Data

US 2007/0121948 A1 May 31, 2007

(30) Foreign Application Priority Data

Nov. 26, 2005 (KR) .................. 10-2005-0113850

(51) Int. Cl.
G06F 21/20 (2006.01)
(52) U.S. Cl. .................. 380/44; 380/255; 380/256; 708/492; 713/169
(58) Field of Classification Search .............. 380/44, 380/255, 256; 708/492; 713/169
See application file for complete search history.

(56) References Cited

U.S. PATENT DOCUMENTS

| 5,854,759 | A * | 12/1998 | Kaliski et al. ............ 708/492 |
| 2002/0015493 | A1 * | 2/2002 | Rose ....................... 380/44 |
| 2003/0026433 | A1 | 2/2003 | Matt |
| 2004/0109564 | A1 * | 6/2004 | Cerf et al. ................ 380/256 |
| 2004/0170280 | A1 * | 9/2004 | Fekri ....................... 380/255 |
| 2006/0143453 | A1 * | 6/2006 | Imamoto et al. .......... 713/169 |

FOREIGN PATENT DOCUMENTS

KR 10-20040098962 11/2004

OTHER PUBLICATIONS

'An Optimal Class of Symmetric Key Generation Systems,' Blom, Rolf, Advances in Cryptology: Proceedings of Eurocrypt 84, Lecture Notes in Computer Science, vol. 209, Springer-Verlag, Berlin, 1984, pp. 335-338.
'Perfectly-Secure Key Distribution for Dynamic Conferences,' Blundo, Carlo, et al., Advances in Cryptology: Proceedings of Eurocrypt 92, Lecture Notes in Computer Science, vol. 740, Springer-Verlag, 1992, pp. 471-486.

* cited by examiner

Primary Examiner—Kieu Oanh Bui
Assistant Examiner—Kevin Richards
(74) Attorney, Agent, or Firm—Ladas & Parry LLP

(57) ABSTRACT

Provided are a key establishment method and system using commutative linear functions. In the method, a server defines a set of linear functions that use elements of a first finite field as coefficients and satisfy a commutative rule, selects a first linear function from the set, and selects a predetermined element from a second finite field. Next, the server selects a second linear function corresponding to each of nodes from the set, generates a predetermined combination function based on the first and second linear functions, generates a value of the second linear function using the selected element as a factor, and transmits the combination function and the value of the second linear function to a corresponding node. Each node receives the value of the second linear function from a server, exchanges the received values with the other nodes, computes a value using the exchanged value as a factor of the combination function, and establishes the computed value as a shared key between the nodes. Therefore, each node can perform key establishment with a small amount of computation and low memory consumption, while guaranteeing end-to-end security.

7 Claims, 3 Drawing Sheets

KEY ESTABLISHMENT METHOD AND SYSTEM USING COMMUTATIVE LINEAR FUNCTION

CROSS-REFERENCE TO RELATED PATENT APPLICATIONS

This application claims the benefit of Korean Patent Application No. 10-2005-0113850, filed on Nov. 26, 2005, in the Korean Intellectual Property Office, the disclosure of which is incorporated herein in its entirety by reference.

BACKGROUND OF THE INVENTION

1. Field of the Invention

The present invention relates to a method and system for securely establishing a key for a security service such as a cryptographic service, and more particularly, to a key establishment method and system using commutative linear functions.

2. Description of the Related Art

In the field of information technologies, various types of cryptographic mechanisms are used to protect data to be transmitted or individual privacy. The safety and reliability of a cryptographic mechanism depend on the safety and management of a cryptographic algorithm to be used, and the management and protection of keys to be used.

Insecure key management leads to a fatal threat to the safety of a cryptographic mechanism regardless of the type of a cryptographic algorithm, and therefore, key management is the most basic factor of the cryptographic mechanism. In key management, it is most important to securely distribute keys to the other party concerned in cryptographic communications without disclosing the keys to a third party.

It is the most simple key establishment method in which all of nodes share one key. However, this method is disadvantageous in that when one of the nodes is damaged, the shared key is exposed, thus allowing a person who has no authority for overall network traffic to perform a decoding operation.

Also, there is another key establishment method in which each node stores a pairwise key to be shared with each of the other nodes. If the number of all of nodes belonging to a network is n, each node stores n−1 pairwise keys for the other nodes. However, this method is disadvantageous in that the greater n is, the greater the number of pairwise keys to be stored, and further, it is difficult to add a node to a network.

Conventionally, a public key-based key establishment method is very often used in a general network. This method requires each node to store only its public key and secret key, thus solving problems related to key storing. However, this method requires a lot of amount of computation. Therefore, this method is difficult to be applied to an Ad-hoc environment that undergoes a limitation to resources, and in particular, a sensor network environment.

Recently, many researches have been conducted into key establishment in the sensor network environment that is very limited to resources available. In particular, most of key establishment methods are designed based on the Blom (EUROCRYPT 84) method and the Blundo (CRYPTO 92) method. Such key establishment methods are performed in a hop-by-hop fashion without using an end-to-end method.

Meanwhile, the key establishment methods in the hop-by-hop fashion in the sensor network are confronting many problems more and more. In particular, the Blom method and the Blundo method require finite field multiplication to be performed several tens times, thereby increasing the load on a sensor node that is limited to resources.

SUMMARY OF THE INVENTION

The present invention provides a key establishment method and system for guaranteeing end-to-end security that allows each node to establish a key while reducing memory consumption and computational complexity.

The present invention also provides a computer readable medium in which a program for executing the key establishment method in a computer is stored.

According to an aspect of the present invention, there is provided a key establishment method comprising a server defining a set of linear functions which use elements of a first finite field as coefficients and satisfy a commutative rule, selecting a first linear function from the set, and selecting a predetermined element from a second finite field; the server selecting a second linear function corresponding to each node from the set; generating combination function based on the first linear function and the second linear function; generating a value of the second linear function using the selected element as a factor; and transmitting the combination function and the value of the second linear function to a corresponding node; and each node exchanging the value of the second linear function received from the server with the other nodes, computing a value of the combination function using the exchanged value as a factor, and establishing the computed value as a shared key among the nodes.

According to another aspect of the present invention, there is provided a key establishment system comprising a key generating unit defining a set of linear functions which use elements of a first finite field as coefficients and satisfy a commutative rule, selecting a first linear function from the set, and selecting a predetermined element from a second finite field; and a key allocating unit selecting a second linear function corresponding to each node from the set, generating a combination function based on the first and second linear functions, generating a value of the second linear function using the selected element as a factor, and transmitting the combination function and the value of the second linear function to a corresponding node.

Accordingly, each node is capable of establishing a key while reducing computational complexity and memory consumption.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Hereinafter, a key establishment method and system using commutative linear functions, according to embodiments of the present invention, will be described in greater detail with reference to the accompanying drawings.

First, a set F to be used in the present invention is as follows:

$$F = \left\{ \sum_{i=0}^{m-1} \alpha_i x^{2^i} \,\middle|\, \alpha_i \in GF(2) \right\}, \quad (1)$$

wherein elements $$f = \sum_{i=0}^{m-1} \alpha_i x^{2^i} \in F$$

and $s,t \in GF(2^m)$ satisfy an equation $f(s+t)=f(s)+f(t)$. That is, an arbitrary element of the set F is comprised of a linear function $GF(2^m) \to GF(2^m)$. Also, two functions $f,g \in F$ satisfy $f \circ g(x) = g \circ f(x)$, i.e., $f(g(x))=g(f(x))$.

Figure 1:
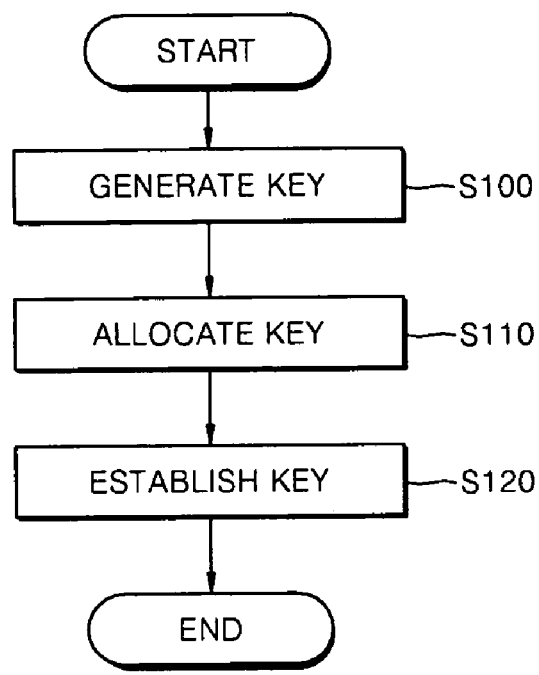
FIG. 1 is a flowchart of a key establishment method according to an embodiment of the present invention.

FIG. 1 is a flowchart of a key establishment method according to an embodiment of the present invention. Referring to FIG. 1, a server 200 of FIG. 2 randomly selects elements $f \in F$ and $\alpha \in GF(2^m)$, and maintains them as secret information (S100). The secret information must be protected not to be exposed to an attacker or nodes that are not concerned.

Figure 2:
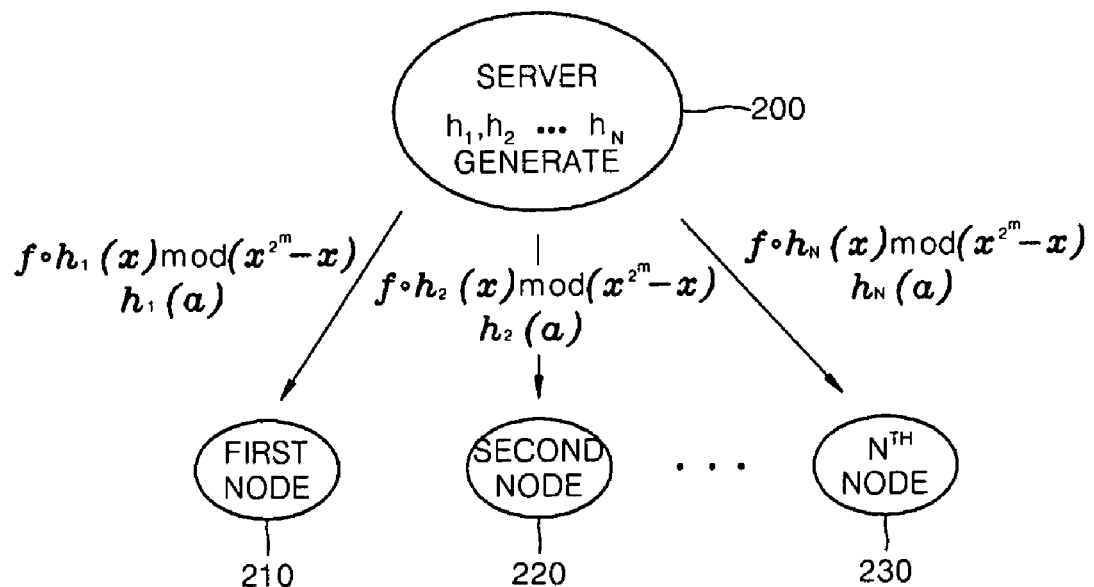
FIG. 2 is a diagram illustrating a key establishment method performed from a server to node according to an embodiment of the present invention.

The server 200 selects $h_i \in F$ as a secret value of each node i, and allocates $f \circ h_i(x) \bmod (x^{2^m}-x)$ and $h_i(\alpha)$ to each of first through $n^{th}$ nodes i 210, 220, ..., 230, using the secret information $f \in F$ and $\alpha \in GF(2^m)$ which are selected in operation S100 (S110). FIG. 2 illustrates an example of a key assignment method.

After receiving $f \circ h_i(x) \bmod (x^{2^m}-x)$ and $h_i(\alpha)$, each node i discloses $h_i(\alpha)$, and maintains $f \circ h_i(x) \bmod (x^{2^m}-x)$ as a secret value so that an attacker or the other nodes cannot recognize it.

Figure 3:
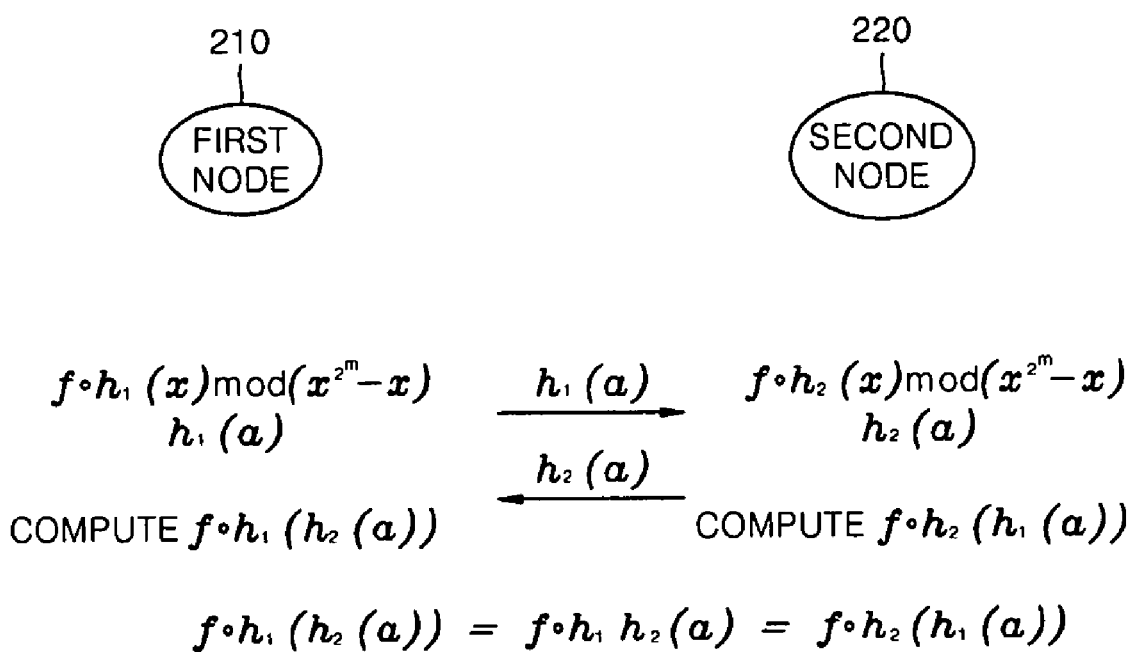
FIG. 3 is a method of establishing a key to be shared between nodes according to an embodiment of the present invention.

Given predetermined values from the server 200, each node i establishes a shared key among the other nodes (S120). A method of establishing a key to be shared between nodes will now be described in greater detail with reference to FIG. 3.

The first node 210 stores $f \circ h_1(x) \bmod (x^{2^m}-x)$ and $h_1(\alpha)$, which are given from the server 200 in operation S110, in its memory, and the second node 220 stores $f \circ h_2(x) \bmod (x^{2^m}-x)$ and $h_2(\alpha)$ in its memory.

The first node 210 transmits $h_1(\alpha)$ to the second node 220, and the second node 220 transmits $h_2(\alpha)$ to the first node 210. The first node 210 computes $f \circ h_1(h_2(\alpha))$ using received $h_2(\alpha)$. $f \circ h_1(h_2(\alpha)) = f \circ h_1 \circ h_2(\alpha) = f \circ h_2(h_1(\alpha))$ is drawn from the commutative characteristics of the above linear functions. Thus, the first and second nodes 210 and 220 set $f \circ h_1 \circ h_2(\alpha)$ as a shared key between them.

A key establishment method according to the present invention has many advantages compared to the prior art.

Since $h_i(\alpha)$ of a node i is an element of $GF(2^m)$ and $f \circ h_i(x) \bmod (x^{2^m}-x)$ is a polynomial having coefficients of m $GF(2)$, each node i stores 2m bits.

Next, the computational complexity of a key establishment method according to the present invention will now be described.

As described above, the first node 210 computes $f \circ h_1(h_2(\alpha))$ to obtain a shared key to be shared with the second node 220.

Since may be $f \circ h_1(x) \bmod (x^{2^m}-x) \in F$, $h_2(\alpha) \in GF(2^m)$, $f \circ h_1(h_2(\alpha))$ may be computed by computing $$p(\gamma) = \sum_{i=0}^{m-1} \alpha_i \gamma^{2^i} \text{ when } p = \sum_{i=0}^{m-1} \alpha_i x^{2^i} \in F, \gamma \in GF(2^m).$$

Here, $\gamma, \gamma^2, \ldots, \gamma^{2^{m-1}}$, which is a square of $\gamma$, needs to be computed.

A normal basis is introduced to effectively express a square operation in $GF(2^m)$ which is a finite field. When expressing an element in $GF(2^m)$ using the normal basis, a square of the element may be expressed by simply using a shift operation.

Based on the characteristics of the normal basis and that a coefficient $\alpha_i$ of P is 0 or 1, $P(\gamma)$ can easily be computed by performing the shift operation m−1 times and performing an addition operation on $GF(2^m)$ having m elements. In this case, computational complexity is very lower than in a conventional key establishment method, and the present invention can be embodied as hardware that is much smaller than a conventional scheme.

Also, in the case of the conventional key establishment method, when direct key sharing is not allowed in the sensor network, a key is transmitted in the hop-by-hop fashion, and thus, the key is disclosed to an intermediate node. However, in the key establishment method according to the present invention, only a public value $h_i(\alpha)$ is transmitted to a destination node, and therefore, a shared key is not disclosed to an intermediate node or an attacker even if the public value $h_i(\alpha)$ is exposed. That is, the key establishment method according to the present invention provides end-to-end security.

In addition, according to the present invention, it is easy to add or delete a node. When a new node j is added, a server randomly generates $h_j \in F$, and allocates $h_j(\alpha)$ and $f \circ h_j(x) \bmod (x^{2^m}-x)$ to the node j. In this case, the other nodes are not influenced by deletion of a node.

Figure 4:
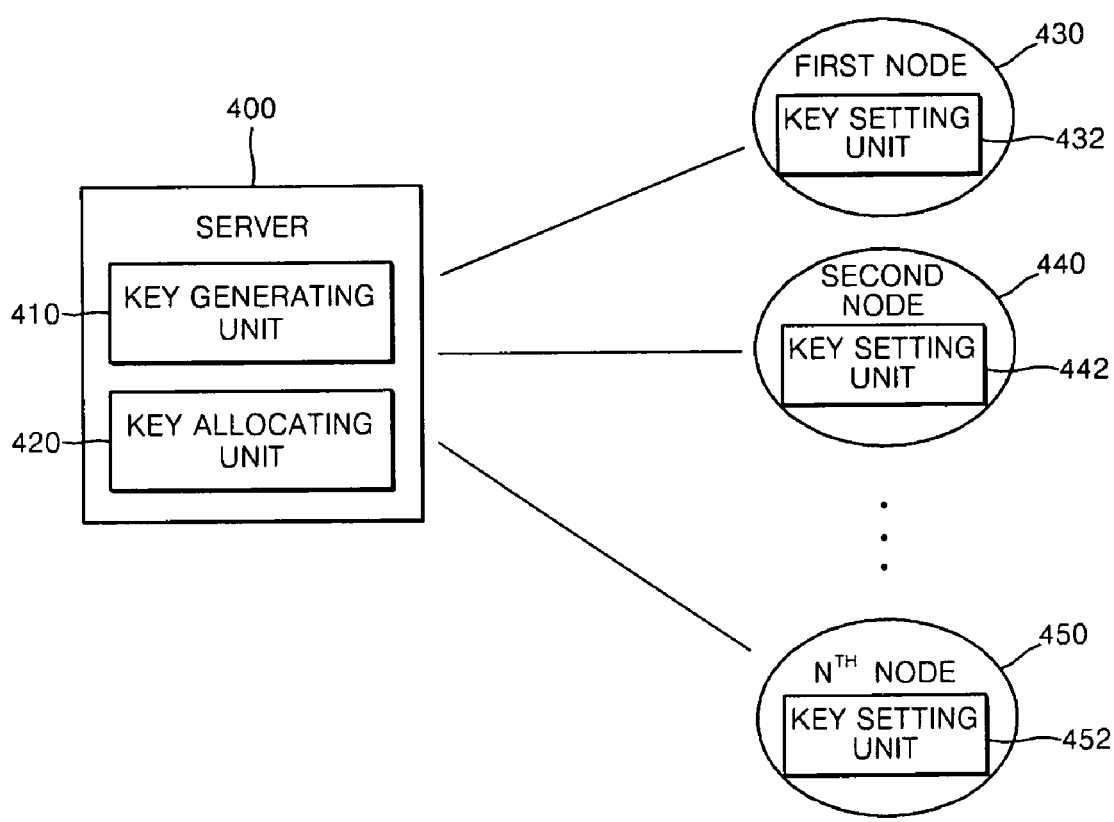
FIG. 4 is a block diagram of a key establishment system according to an embodiment of the present invention.

FIG. 4 is a block diagram of a key establishment system according to an embodiment of the present invention. Referring to FIG. 4, the key establishment system includes a server 400 comprised of a key generating unit 410 and a key allocating unit 420, and more than one node given a key from the server 400, i.e., first through $n^{th}$ nodes 430, 440, ..., 450.

The key generating unit 410 defines a set $$F = \left\{ \sum_{i=0}^{m-1} \alpha_i x^{2^i} \,\middle|\, \alpha_i \in GF(2) \right\},$$

that is a set of linear functions that use elements of a first finite field $GF(2)$ as coefficients and satisfy commutative rules, selects a first linear function $f \in F$ from the set F, and selects a predetermined element $\alpha \in GF(2^m)$ from a second finite field.

The key allocating unit 420 selects a second linear function $h_i \in F$ indicating each node from the set F of the linear functions, defined by the key generating unit 410; generates a combination function $f \circ h_i(x) \bmod (x^{2^m}-x)$ based on the selected second linear function $h_i \in F$ and the first linear function $f \in F$ selected by the key generating unit 410; generates the values $h_i(\alpha)$ of the second linear functions, each using as a factor a predetermined element selected by the key generating unit 410, and transmits the combination function $f \circ h_i(x) \bmod (x^{2^m}-x)$ and the value $h_i(\alpha)$ to each of the nodes 430, 440, ..., 450.

A key setting unit 432 of the first node 430, a key setting unit 442 of the second node 440, and a key setting unit 452 of the $n^{th}$ node 450 respectively receive the value $h_i(\alpha)$ of the second linear function, exchange the received value $h_i(\alpha)$ with those of the other nodes, compute $f \circ h_i(h_j(\alpha)) = f \circ h_i \circ h_j(\alpha) = f \circ h_j(h_i(\alpha))$ using the exchanged value $h_i(\alpha)$ as a factor of the combination function $f \circ h_i(x) \bmod(x^{2^m} - x)$ and set $f \circ h_i(h_j(\alpha)) = f \circ h_i \circ h_j(\alpha) = f \circ h_j(h_i(\alpha))$ as a shared key between them.

The present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as a computer readable code in the distributed system.

As compared to the prior art, a key establishment method according to the present invention has the following advantages.

1. It is possible to establish a shared key between nodes with low memory consumption.

2. It is possible to establish a shared key between nodes with a very small amount of computation. In particular, the key establishment method according to the present invention is accomplished by performing only a shift operation and an addition operation on $GF(2^m)$. Therefore, this method can be realized as hardware that is far smaller than in the prior art.

3. It is possible to effectively add a node to or delete a node from a network, and further support a network with a large number of elements.

4. It is possible to provide end-to-end security that a conventional sensor network does not support.

As described above, a key establishment method according to the present invention can be used for key establishment for cryptographic mechanisms, and security services, such as a certification service, in various environments. In particular, the present invention provides a key establishment method optimized for an Ad-hoc network environment that is limited to resources.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A key establishment method comprising:
   (a) a server defining a set of linear functions which use elements of a first finite field as coefficients and satisfy a commutative rule, selecting a first linear function from the set, and selecting a predetermined element from a second finite field;
   (b) the server, for each of a plurality of nodes, selecting a second linear function from the set; generating a combination function based on the first linear function and the second linear function of the corresponding node; generating a value of the second linear function of the corresponding node using the selected element as a factor; and transmitting the combination function and the value of the second linear function to the corresponding node; and
   (c) each node exchanging the value of the second linear function received from the server with the other nodes, computing a value of the combination function using the exchanged value as a factor, and establishing the computed value as a shared key among the nodes wherein (b) comprises generating the combination function $f \circ h_i(x) \bmod(x^{2^m} - x)$ based on the first linear function $f \in F$ and the second linear function $h_i \in F$ which are selected from the set $$F = \left\{ \sum_{i=0}^{m-1} \alpha_i x^{2^i} \,\middle|\, \alpha_i \in GF(2) \right\},$$

and transmitting the combination function $f \circ h_i(x) \bmod(x^{2^m} - x)$ and the value $h_i(\alpha)$ of the second linear function to each node.

2. The method of claim 1, wherein the first finite field is $GF(2)$, and the second finite field is $GF(2^m)$.

3. The method of claim 1, wherein during (a), the set of the linear functions is defined as $$F = \left\{ \sum_{i=0}^{m-1} \alpha_i x^{2^i} \,\middle|\, \alpha_i \in GF(2) \right\},$$

and a predetermined element $\alpha \in GF(2^m)$ is selected from the second finite field.

4. The method of claim 1, wherein during (c), a first node i and a second node j respectively receive the combination function $f \circ h_i(x) \bmod(x^{2^m} - x)$ and the value $h_i(\alpha)$ of the second linear function, and the combination function $f \circ h_j(x) \bmod(x^{2^m} - x)$ and the value $h_j(\alpha)$ of the second linear function from the server, exchange the values $h_i(\alpha)$ and $h_j(\alpha)$ with each other, and set $f \circ h_i(h_j(\alpha)) = f \circ h_i \circ h_j(\alpha) = f \circ h_j(h_i(\alpha))$ as a shared key.

5. A key establishment system comprising:
   a key generating unit of a server, the key generating unit defining a set of linear functions which use elements of a first finite field as coefficients and satisfy a commutative rule, selecting a first linear function from the set, and selecting a predetermined element from a second finite field; and
   a key allocating unit of a server, wherein for each of a plurality of nodes the key allocating unit selecting a second linear function from the set, generating a combination function based on the first linear function and the second linear function of the corresponding node, generating a value of the second linear function of the corresponding node using the selected element as a factor, and transmitting the combination function and the value of the second linear function to the corresponding node wherein the key generating unit defines the set of the linear functions as $$F = \left\{ \sum_{i=0}^{m-1} \alpha_i x^{2^i} \,\middle|\, \alpha_i \in GF(2) \right\}$$

and selects a predetermined element $\alpha \in GF(2^m)$ from the second finite field, and the key allocating unit generating a combination function $f \circ h_i(x) \bmod (x^{2^m}-x)$ based on the first linear function $f \in F$ and the second linear function $h_i \in F$ which are selected from the set $$F = \left\{ \sum_{i=0}^{m-1} \alpha_i x^{2^i} \;\middle|\; \alpha_i \in GF(2) \right\},$$

and transmitting the combination function $f \circ h_i(x) \bmod (x^{2^m}-x)$ and a value $h_i(\alpha)$ of the second linear function to each node; and wherein each node exchanges the received value of the second linear function with the other nodes, computes a value using the exchanged value as a factor of the combination function, and sets the computed value as a shared key between the nodes.

6. The system of claim 5, wherein the first finite field is $GF(2)$, and the second finite field is $GF(2^m)$.

7. The system of claim 5, wherein a first node i and a second node j respectively receive the combination function $f \circ h_i(x) \bmod (x^{2^m}-x)$ and the value $h_i(\alpha)$ of the second linear function, and the combination function $f \circ h_j(x) \bmod (x^{2^m}-x)$ and the value $h_j(\alpha)$ of the second linear function from the server, exchange the values $h_i(\alpha)$ and $h_j(\alpha)$ with each other, and set $f \circ h_i(h_j(\alpha)) = f \circ h_i \circ h_j(\alpha) = f \circ h_j(h_i(\alpha))$ as a shared key.

* * * * *